(12) United States Patent
Kaminski et al.

(10) Patent No.: US 7,078,845 B2
(45) Date of Patent: Jul. 18, 2006

(54) OPTIMIZED DRIVE TRAIN FOR A TURBINE DRIVEN ELECTRICAL MACHINE

(75) Inventors: Christopher Anthony Kaminski, Schenectady, NY (US); Yu Wang, Clifton Park, NY (US); Anand Shankar Tanavde, Slingerlands, NY (US); James Pelligrino Alexander, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/709,741

(22) Filed: May 26, 2004

(65) Prior Publication Data

US 2005/0264129 A1   Dec. 1, 2005

(51) Int. Cl.
*H02K 1/22* (2006.01)
(52) U.S. Cl. .......................................... 310/261; 29/598
(58) Field of Classification Search ................ 310/261, 310/262, 216; 29/598
See application file for complete search history.

(56) References Cited

U.S. PATENT DOCUMENTS

| | | | |
|---|---|---|---|
| 336,636 A * | 2/1886 | Gerard-Lescuyer | 310/40 R |
| 4,363,982 A | 12/1982 | Kaminski | |
| 4,363,986 A | 12/1982 | Joho et al. | |
| 4,490,638 A * | 12/1984 | Lind | 310/269 |
| 4,543,503 A | 9/1985 | Kaminski et al. | |
| 4,667,125 A | 5/1987 | Kaminski et al. | |
| 4,709,177 A | 11/1987 | Kaminski | |
| 4,814,655 A | 3/1989 | Kaminski | |
| 5,065,064 A | 11/1991 | Kaminski | |
| 5,144,182 A * | 9/1992 | Lemmer et al. | 310/217 |
| 5,281,877 A | 1/1994 | Kazmierczak et al. | |
| 5,358,432 A | 10/1994 | Shih et al. | |
| 5,811,907 A * | 9/1998 | Fukuda et al. | 310/254 |
| 5,886,434 A | 3/1999 | Nygard | |
| 5,929,550 A | 7/1999 | Kaminski et al. | |
| 5,986,380 A | 11/1999 | Kaminski et al. | |
| 6,081,178 A | 6/2000 | Wang et al. | |
| 6,181,228 B1 | 1/2001 | Laskaris et al. | |
| 6,194,807 B1 | 2/2001 | Kaminski et al. | |
| 6,198,371 B1 | 3/2001 | Laskaris et al. | |
| 6,201,462 B1 | 3/2001 | Laskaris et al. | |
| 6,239,527 B1 | 5/2001 | Kaminski et al. | |
| 6,246,308 B1 | 6/2001 | Laskaris et al. | |
| 6,291,919 B1 | 9/2001 | Ganti et al. | |
| 6,313,561 B1 | 11/2001 | Nygard et al. | |

(Continued)

FOREIGN PATENT DOCUMENTS

EP    0 771 061 A    5/1997

(Continued)

*Primary Examiner*—Joseph Waks
(74) *Attorney, Agent, or Firm*—Nixon & Vanderhye P.C.

(57) ABSTRACT

A rotor in a electrical machine comprises a magnetic core having at least two poles, a plurality of winding assemblies, one for each pole, and a damper winding enclosing at least a portion of the magnetic core and winding assemblies. The damper winding has (i) a plurality of electrically conductive rings concentric with a rotational axis of the magnetic core and (ii) a plurality of bars extending parallel to the rotational axis of the magnetic core and connecting to each of the rings. A radially outward surface of each of the bars is connected to a respective radially inner surface of each of the rings. A spindle of the magnetic core has first and second flat surfaces extending perpendicular to a direct axis of the magnetic core. The magnetic core may include first and second projections extending in opposite directions along the quadrature axis.

19 Claims, 6 Drawing Sheets

U.S. PATENT DOCUMENTS

| | | |
|---|---|---|
| 6,339,268 B1 | 1/2002 | Kaminski et al. |
| 6,346,753 B1 | 2/2002 | Jarczynski et al. |
| 6,369,482 B1 | 4/2002 | Rink, Jr. et al. |
| 6,415,613 B1 | 7/2002 | Ackermann et al. |
| 6,437,476 B1 | 8/2002 | Nygard et al. |
| 6,438,969 B1 | 8/2002 | Laskaris et al. |
| 6,442,949 B1 | 9/2002 | Laskaris et al. |
| 6,448,686 B1 | 9/2002 | Dawson et al. |
| 6,495,942 B1 | 12/2002 | Kaminski et al. |
| 6,509,819 B1 * | 1/2003 | Snitchler et al. ............ 335/216 |
| 6,590,311 B1 * | 7/2003 | Wang et al. ................ 310/261 |
| 2003/0025407 A1 | 2/2003 | Young et al. |

FOREIGN PATENT DOCUMENTS

| | | | |
|---|---|---|---|
| EP | 942517 A2 | * | 9/1999 |
| JP | 61049649 A | * | 3/1986 |
| JP | 63310351 A | * | 12/1988 |
| JP | 01050754 A | * | 2/1989 |
| JP | 01126156 A | * | 5/1989 |

* cited by examiner

OPTIMIZED DRIVE TRAIN FOR A TURBINE DRIVEN ELECTRICAL MACHINE

BACKGROUND OF INVENTION

The present invention relates to electrical machines such as (but not limited to) electrical generators and, more particularly, to a generator rotor having a rotor which corrects for stiffness dissymmetry.

In a conventional generator having a rotor and a stator, the rotor is typically provided with field windings that excite the generator while receiving a current from a current source. The stator is provided with armature windings from which electrical power is output. Typical rotor construction requires that a field winding be assembled, bar by bar, in the radial cross-slots milled into the generator rotor. Containment of the rotor field windings within the slots milled in the rotor body is typically achieved using rotor wedges, rotor teeth and retaining rings.

The slots milled in the generator rotor induce stepwise changes in stiffness along the length of the rotor body. These changes in stiffness can be a source of fretting of parts that span these slots. The behavior of the rotor in response to power system disturbances has typically been addressed by providing a damper circuit through the dovetails of the rotor wedges that prevent the rotor field windings from lifting out of the rotor slots under a centrifugal load. A circuit between adjacent rotor slots has been completed by providing a shorting strap that lies under the retaining rings at each end of the rotor body.

The dynamic performance and system behavior of a turbine-driven generator drive train is very dependent upon the stiffness, mass and specific architecture of its constituent parts. It would therefore be desirable to tune properties and capabilities of the constituent parts to optimize the performance of the generator drive train. For example, it would be desirable to be able to tune the properties and capabilities of the generator drive train by adjusting the stiffness of the rotor body to correct any dissymmetry in stiffness of the rotor body. It would also be desirable to provide air gap adjustment between the rotor and stator of the electrical generator.

SUMMARY OF INVENTION

In one exemplary aspect of the present invention, a rotor in an electrical machine comprises a magnetic core having at least two poles, a plurality of winding assemblies, one for each pole, and a damper winding enclosing at least a portion of the magnetic core and the winding assemblies. The damper winding has (i) a plurality of electrically conductive rings concentric with a rotational axis of the magnetic core and (ii) a plurality of bars extending parallel to the rotational axis of the magnetic core and connecting to each of the rings. A radially outward surface of each of the bars is connected to a respective radially inner surface of each of the rings. At least one of the bars may include a plurality of projection tabs extending radially beyond the inner surface of the rings into gaps formed between successive rings. The plurality of rings may comprise at least three rings. The magnetic core may also include a spindle having first and second flat surfaces extending perpendicular to a direct axis of the magnetic core. The magnetic core may include first and second parallel faces extending substantially perpendicular to the quadrature axis of the magnetic core, a first projection connected to the first parallel face and extending beyond the first parallel face in a direction along the quadrature axis, and a second projection connected to the second parallel face and extending beyond the second parallel face in a direction along the quadrature axis but opposite to the direction in which the first projection extends. The first and second projections may be integrally connected to the first and second parallel faces, respectively. The first and second projections may each have a trapezoidal-shaped or semicircular-shaped cross section.

In another exemplary aspect of the invention, a damper winding in a rotor having an magnetic core and a plurality of winding assemblies comprises: a plurality of electrically conductive rings arranged concentric with a rotational axis of the magnetic core and radially outward of the magnetic core and winding assemblies, and a plurality of bars extending parallel to the rotational axis of the magnetic core and connecting to each of the rings. A radially outward surface of each of the bars is connected to a respective radially inner surface of each of the rings. At least one of the bars may include a plurality of projection tabs extending radially beyond the inner surface of the rings into gaps formed between successive rings. The plurality of rings comprise at least three rings.

In another exemplary aspect of the invention, a rotor comprises a plurality of winding assemblies and a magnetic core having at least two poles each of which is coupled to a respective one of the winding assemblies. The magnetic core includes first and second parallel faces extending substantially perpendicular to a quadrature axis of the magnetic core, a first projection connected to the first parallel face and extending beyond the first parallel face in a direction along the quadrature axis, and a second projection connected to the second parallel face and extending beyond the second parallel face in a direction along the quadrature axis but opposite to the direction in which the first projection extends. The first and second projections may be integrally connected to the first and second parallel faces, respectively. The first and second projections each has a trapezoidal-shaped or a semicircular-shaped cross section.

In another exemplary aspect of the invention, a rotor in an electrical machine comprises a plurality of winding assemblies and a magnetic core having at least two poles each of which is coupled to a respective one of the winding assemblies, the magnetic core including a spindle having first and second flat surfaces extending perpendicular to a direct axis of the magnetic core. The magnetic core may further include first and second parallel faces extending substantially perpendicular to the quadrature axis of the magnetic core, a first projection connected to the first parallel face and extending beyond the first parallel face in a direction along the quadrature axis, and a second projection connected to the second parallel face and extending beyond the second parallel face in a direction along the quadrature axis but opposite to the direction in which the first projection extends. The first and second projections may each have a trapezoidal-shaped cross section or a semicircular-shaped cross section.

DETAILED DESCRIPTION

Figure 1:
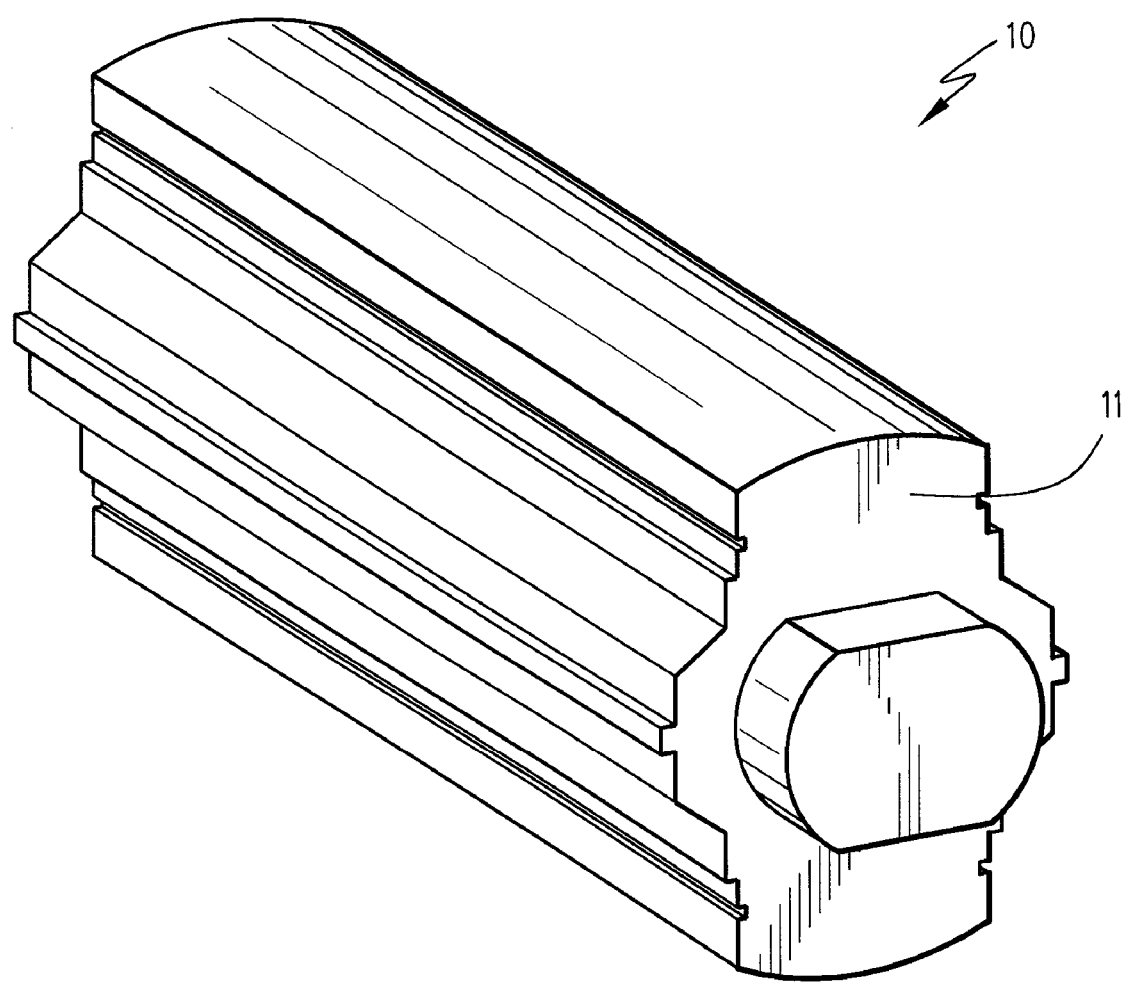
FIG. 1 is a perspective view of an exemplary rotor body core in an electrical machine in accordance with an exemplary embodiment of the present invention.
Figure 2:
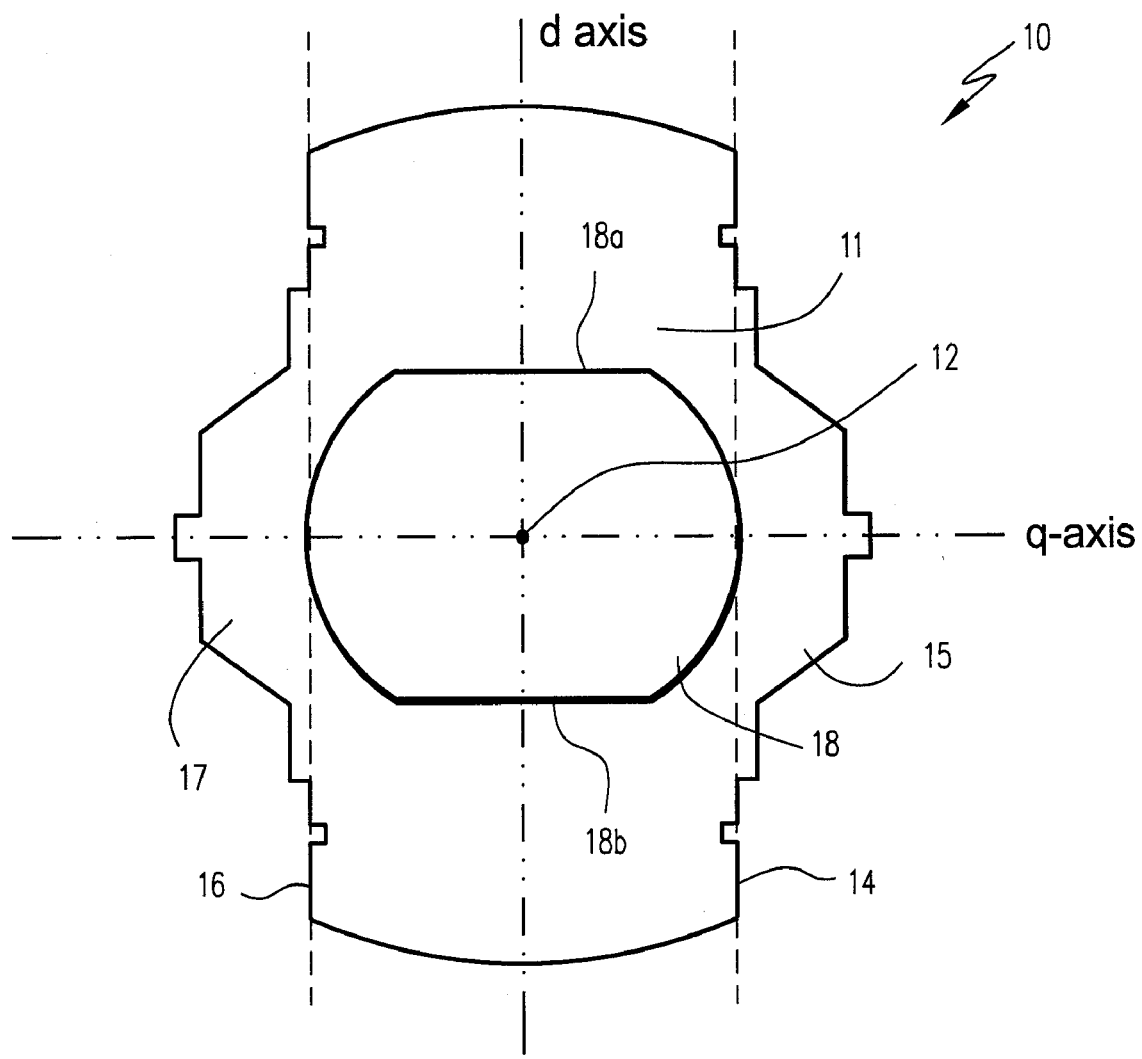
FIG. 2 is a cross-sectional view of the rotor body core illustrated in FIG. 1.
Figure 3:
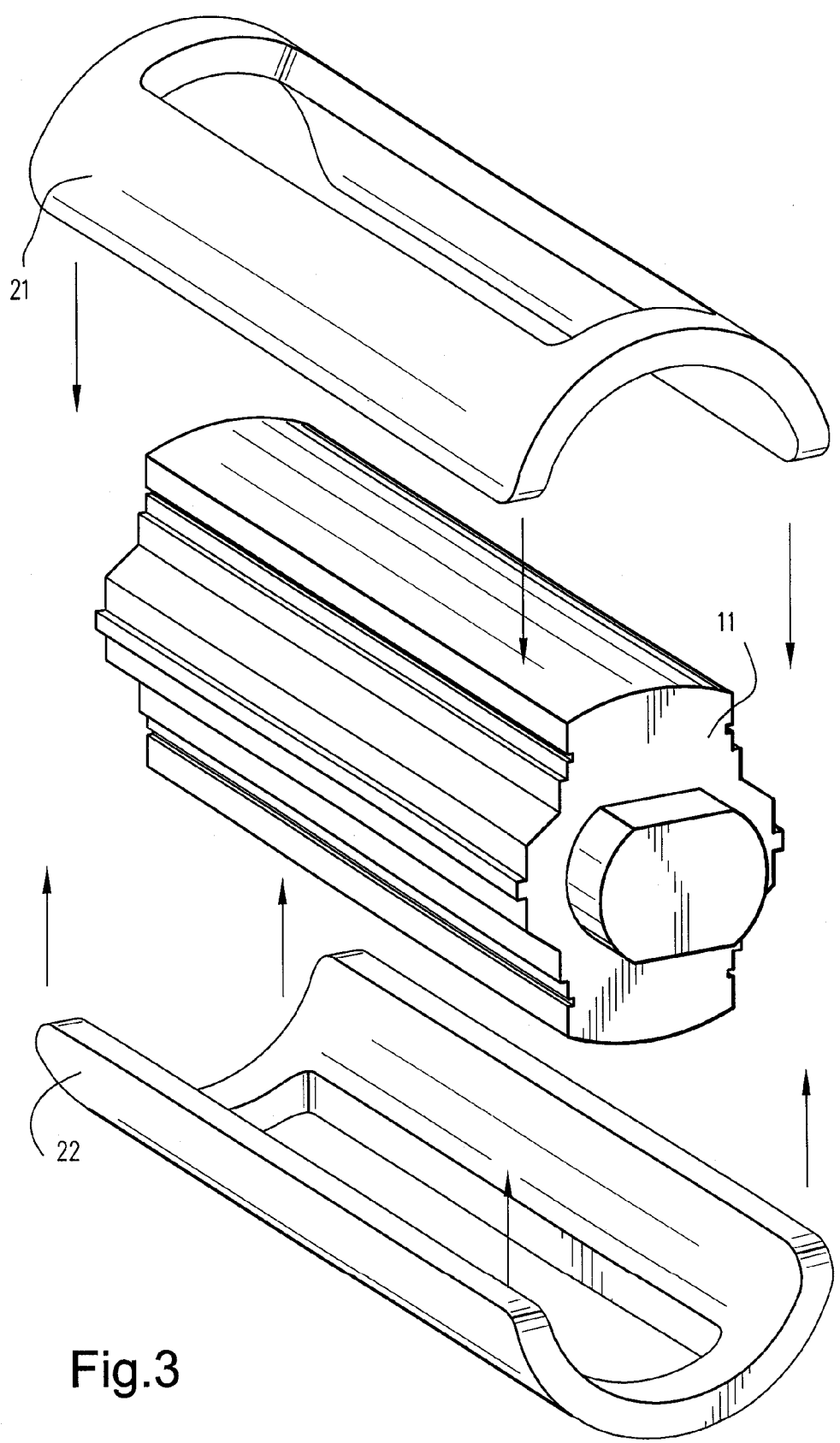
FIG. 3 is a fragmentary perspective view of the rotor having a multi-pole magnetic core and a plurality of winding assemblies.

FIGS. 1–3 illustrate an electrical machine such as, but not limited to, an electrical generator. The electrical machine, hereinafter referred to as a generator for ease of description but in no way limiting the invention, includes an electrical generator rotor 10 having a multi-pole magnetic core 11 (two-pole core shown) and a plurality of winding assemblies 21, 22, one for each pole. Rotor core 11 includes a rotational axis 12 extending longitudinally along the rotor core 11. Rotational axis 12 is positioned at the intersection between the direct axis ("d-axis") and the quadrature axis ("q-axis") of rotor core 11. As illustrated in FIG. 2, the q-axis is perpendicular to both the d-axis and the rotational axis 12 of rotor core 11. The reluctance of a magnetic circuit in an electric power generator is most sensitive to the size in the gap between the generator rotor and stator along the d-axis where most of the flux transfer takes place and is least sensitive along the q-axis. Centrifugal loading, on the other hand, is primarily distributed along the q-axis.

Core 11 includes a spindle 18 having opposing flat surfaces 18a and 18b. Flat surfaces 18a and 18b extend parallel to the q-axis and thus perpendicular to the d-axis. Flat surfaces 18a and 18b enable stiffness dissymmetry in core 11 to be corrected.

Figure 4:
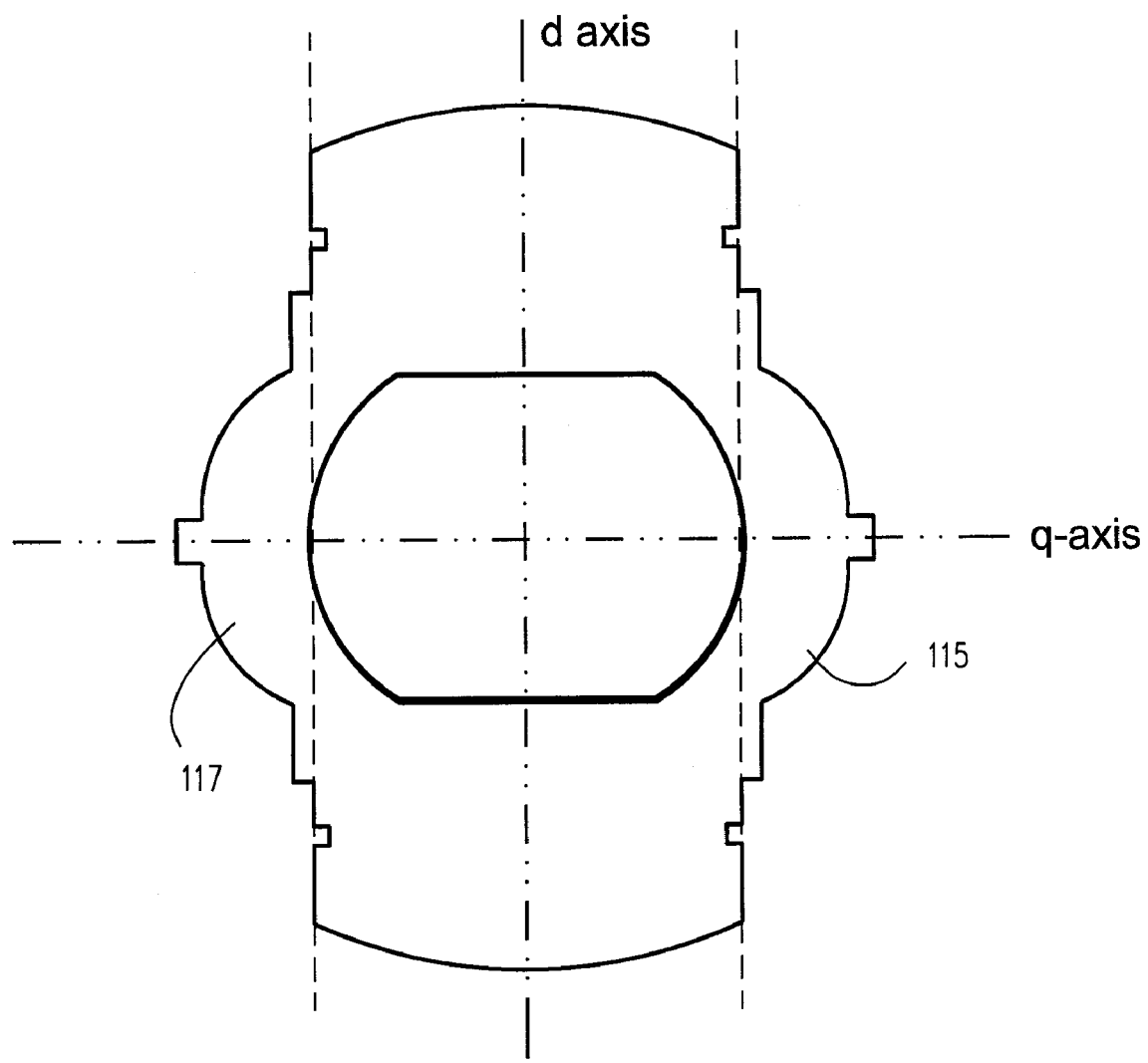
FIG. 4 is another embodiment of a rotor body core of an electrical machine having semicircular-shaped projections extending from opposing parallel faces of a rotor body.

Core 11 also includes two substantially flat face surfaces 14 and 16 extending parallel to the d-axis and thus extending perpendicular to the q-axis. Projections 15 and 17 extend outside of parallel flat face surfaces 14 and 16, respectively, in opposing directions along the q-axis. Projection 15 is integrally connected to surface 14 and extends beyond surface 14 in a direction along the q-axis. Projection 17 is integrally connected to surface 16 and extends beyond surface 16 along the q-axis in a direction opposite to that of projection 15. As illustrated in FIG. 2, each of projections 15 and 17 have a trapezoidal cross-sectional area. Alternatively, the projections may have a semicircular cross-sectional area as illustrated by projections 115 and 117 of FIG. 4. Projections 15 and 17 (or projections 115 and 117) are capable of providing additional corrections to stiffness dissymmetry of rotor core 11. Accordingly, the dynamic performance of a drive train of the rotor (e.g., a gas turbine-driven rotor drive train) can be improved by adjusting the stiffness of the rotor spindle 18 through the shape of flat surfaces 18a and 18b and building out projections 15 and 17 from the body of rotor core 11 beyond surfaces 14 and 16. Performance of the rotor drive train can thus be optimized by adjusting the stiffness, mass and architecture of core 11.

Figure 5:
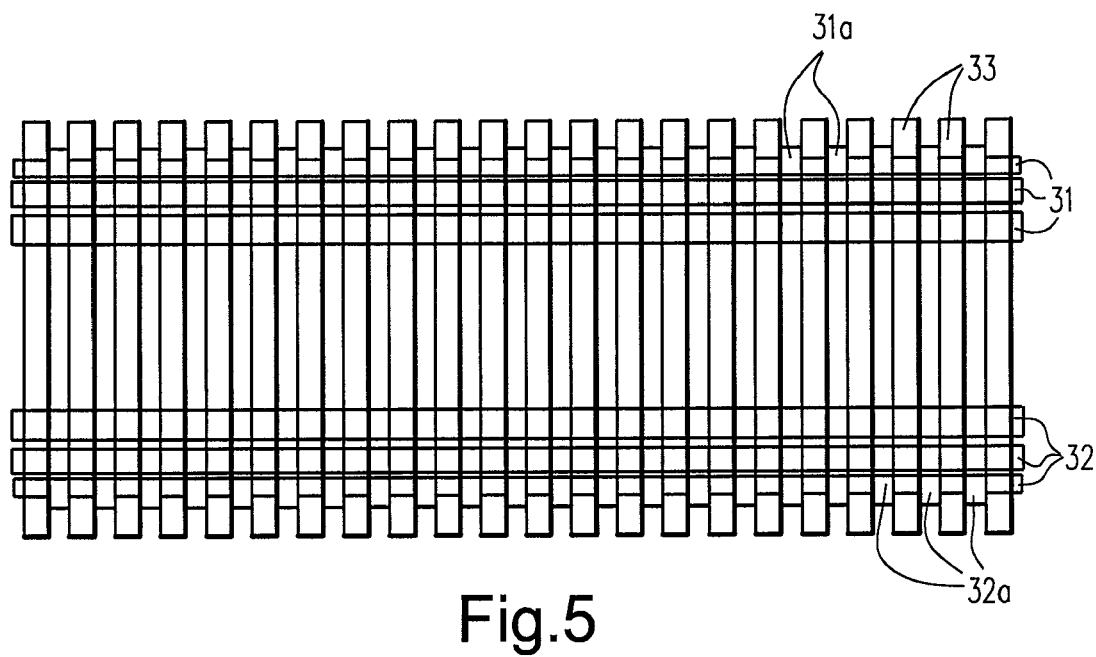
FIG. 5 is a side view of a damper winding of a rotor having a plurality of electrically conductive rings and a plurality of axial bars in accordance with an exemplary embodiment of the present invention.
Figure 6:
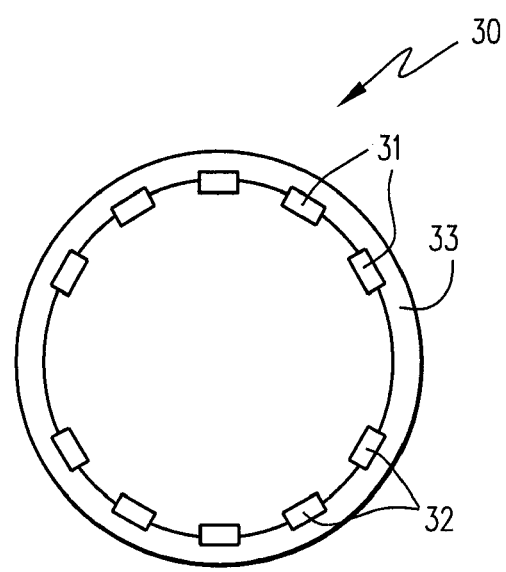
FIG. 6 is an end view of the damper winding illustrated in FIG. 5.
Figure 7:
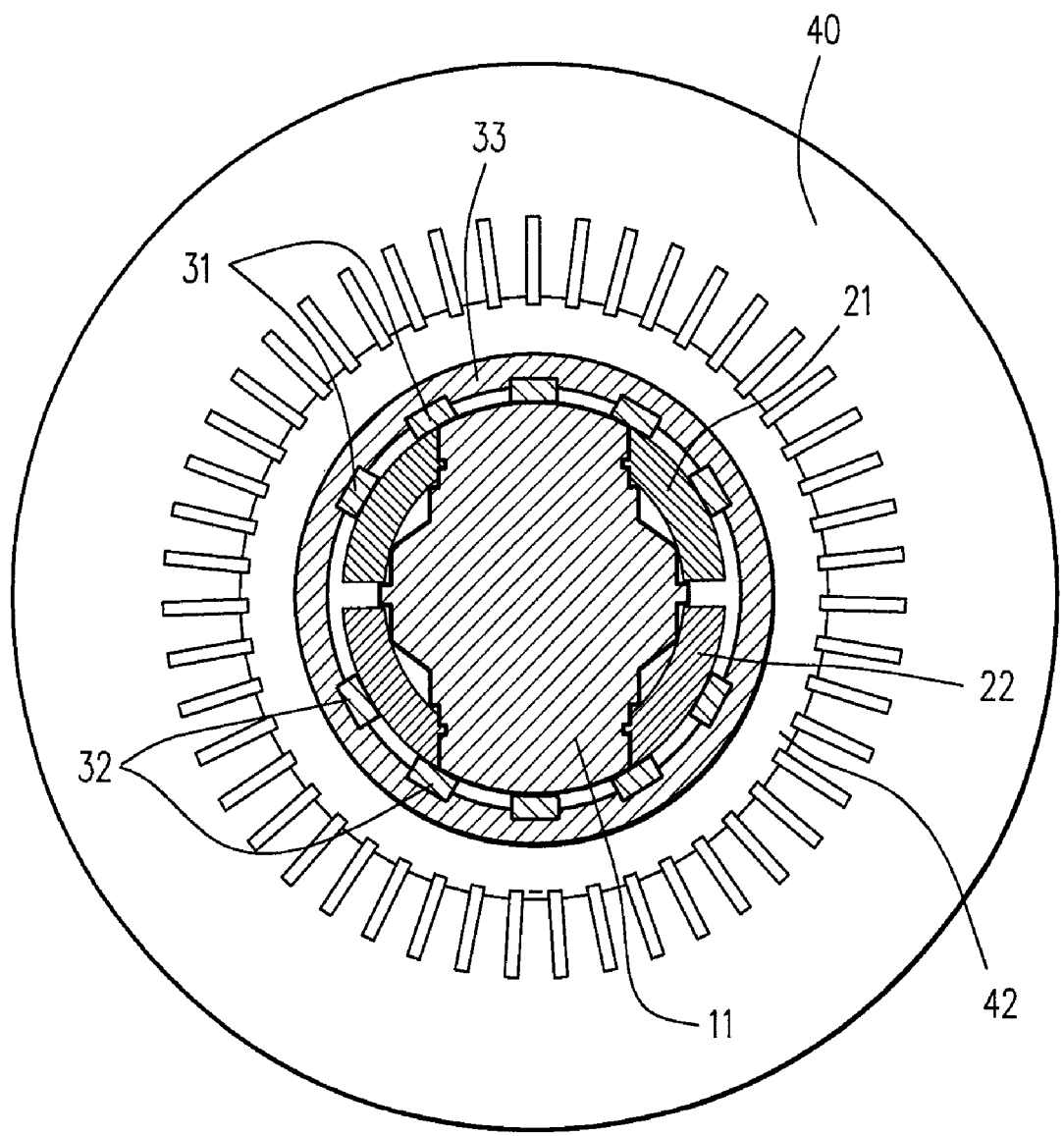
FIG. 7 is a cross-sectional view of an electrical machine such as a generator including a stator and a rotor in accordance with an exemplary embodiment of the present invention.

FIGS. 5–7 illustrate a damper winding 30 including a series of electrically conductive rings 33 and a first set of axial bars 31 (five axial bars 31 shown in the exemplary embodiment illustrated in FIGS. 5–7) and a second set of axial bars 32 (again, five axial bars shown). Each of conductive rings 33 are concentric with the axis of rotation 12 and are arranged radially outward of and along the axial length of core 11 and rotor winding assemblies 21 and 22. Axially extending bars 31 and 32 connect rings 33 together to form a damper winding composed of an electrically conductive cylindrical grid. In particular, the radially outward surfaces of bars 31 and 32 are connected to the radially inward surfaces of rings 33.

Each of axial bars 31 include a plurality of integral projection tabs 31a extending in a radially outward direction (see FIGS. 5 and 6). Similarly, each of bars 32 include a plurality of projection tabs 32a extending in a radially outward direction. Projection tabs 31a define a radially outward surface of each of bars 31 and projection tabs 32a define a radially outward surface of bars 32. Each of the projection tabs 31a and 32a project beyond the radially inward surface of rings 33 and into gaps formed between successive rings 33. Projection tabs 31a and 32a allow the position of rings 33 to be appropriately located in the axial direction. Manufacture of the damper winding can thus be optimized.

As illustrated in FIG. 7, damper winding 30 is arranged to enclose other parts of the rotor including rotor body 11 and winding assemblies 21 and 22. By arranging damper winding 30 around body 11 and winding assemblies 21 and 22, winding assemblies 21 and 22 can be resisted from being lifted out of core 11 under centrifugal loading and winding assemblies 21 and 22 can be shielded from high harmonic currents induced from a stator 40. Damper winding 30 also reduces forces resulting from rotation of an unbalanced (e.g., nonsymmetrical) force load and reduces rotor harmonics.

As illustrated in FIG. 7, stator 40 encloses rotor 10 including core 11, winding assemblies 21, 22 and damper winding 30. An air gap 42 is established between rotor 10 and stator 40. Rotor 10 is rotated about its rotational axis 12 to generate electric power. In one specific application to a rotor with composite enclosure, the stiffness of the magnetic coupling between the rotor and stator can be improved by enlarging the air gap. This may be accomplished as a result of the greater current carrying capability of a rotor architecture with a composite enclosure.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A rotor in an electrical machine, the rotor comprising:
    a magnetic core having at least two poles;
    a plurality of winding assemblies, one for each pole; and
    a damper winding enclosing at least a portion of the magnetic core and the winding assemblies, the damper winding having (i) a plurality of electrically conductive rings concentric with a rotational axis of the magnetic core and (ii) a plurality of bars extending parallel to the rotational axis of the magnetic core and connecting to each of the rings, a radially outward surface of each of the bars being connected to a respective radially inner surface of each of the rings.

2. A rotor as in claim 1, wherein at least one of the bars includes a plurality of projection tabs extending radially beyond the inner surface of the rings into gaps formed between successive rings.

3. A rotor as in claim 1 wherein the plurality of rings comprise at least three rings.

4. A rotor as in claim 1 wherein the magnetic core includes a spindle having first and second flat surfaces extending perpendicular to a direct axis of the magnetic core.

5. A rotor as in claim 1 wherein the magnetic core includes first and second parallel faces extending substantially perpendicular to a quadrature axis of the magnetic core, a first projection connected to the first parallel face and extending beyond the first parallel face in a direction along the quadrature axis, and a second projection connected to the second parallel face and extending beyond the second parallel face in a direction along the quadrature axis but opposite to the direction in which the first projection extends.

6. A rotor as in claim 5 wherein the first and second projections are integrally connected to the first and second parallel faces, respectively.

7. A rotor as in claim 5 wherein the first and second projections each has a trapezoidal-shaped cross section.

8. A rotor as in claim 5 wherein the first and second projections each has a semicircular-shaped cross section.

9. A damper winding in a rotor having a magnetic core and a plurality of winding assemblies, the damper winding comprising:
a plurality of electrically conductive rings arranged concentric with a rotational axis of the magnetic core and radially outward of the magnetic core and winding assemblies; and
a plurality of bars extending parallel to the rotational axis of the magnetic core, a radially outward surface of each of the bars being connected to a respective radially inner surface of each of the rings.

10. A damper winding as in claim 9, wherein at least one of the bars includes a plurality of projection tabs extending radially beyond the inner surface of the rings into gaps formed between successive rings.

11. A damper winding as in claim 9 wherein the plurality of rings comprise at least three rings.

12. A rotor in an electrical machine, the rotor comprising:
a plurality of winding assemblies; and
a magnetic core having at least two poles each of which is coupled to a respective one of the winding assemblies, the magnetic core including:
first and second parallel faces extending substantially perpendicular to a quadrature axis of the magnetic core,
a first projection connected to the first parallel face and extending beyond the first parallel face in a direction along the quadrature axis,
a second projection connected to the second parallel face and extending beyond the second parallel face in a direction along the quadrature axis but opposite to the direction in which the first projection extends, and
a spindle having a constant cross-sectional shape and first and second flat surfaces extending perpendicular to the direct axis of the magnetic core.

13. A rotor as in claim 12 wherein the first and second projections are integrally connected to the first and second parallel faces, respectively.

14. A rotor as in claim 12 wherein the first and second projections each has a trapezoidal-shaped cross section.

15. A rotor as in claim 12 wherein the first and second projections each has a semicircular-shaped cross section.

16. A rotor in an electrical machine, the rotor comprising:
a plurality of winding assemblies; and
a magnetic core having at least two poles each of which is coupled to a respective one of the winding assemblies, the magnetic core including a spindle having a constant cross-sectional shape and first and second flat surfaces extending perpendicular to a direct axis of the magnetic core.

17. A rotor as in claim 16 wherein the magnetic core further includes first and second parallel faces extending substantially perpendicular to the quadrature axis of the magnetic core, a first projection connected to the first parallel face and extending beyond the first parallel face in a direction along the quadrature axis, and a second projection connected to the second parallel face and extending beyond the second parallel face in a direction along the quadrature axis but opposite to the direction in which the first projection extends.

18. A rotor as in claim 17 wherein the first and second projections each has a trapezoidal-shaped cross section.

19. A rotor as in claim 17 wherein the first and second projections each has a semicircular-shaped cross section.

* * * * *